United States Patent
Kalyaeva et al.

[15] 3,644,849
[45] Feb. 22, 1972

[54] MULTISECTION ELECTROMECHANICAL BANDPASS FILTER

[72] Inventors: Alla Nikolaevna Kalyaeva, prosp. Toreza, 102, korp. 5, kv. 177; Dmitry Vasilievich Pletnev, ul. Komsomola, 10, kv. 26, both of Lenningrad, U.S.S.R.

[22] Filed: June 26, 1969

[21] Appl. No.: 836,850

[52] U.S. Cl. ............................................. 333/71, 333/30 M
[51] Int. Cl. ...................................... H03h 9/26, H03h 9/28
[58] Field of Search ........................................ 333/30, 71, 72

[56] References Cited

UNITED STATES PATENTS

| | | | |
|---|---|---|---|
| 2,617,882 | 11/1952 | Roberts | 333/71 |
| 2,647,948 | 8/1953 | Roberts et al. | 333/71 |
| 2,762,985 | 9/1956 | George | 333/71 |
| 2,926,315 | 2/1960 | George | 333/71 |
| 2,982,926 | 5/1961 | May | 333/71 X |

FOREIGN PATENTS OR APPLICATIONS

| | | | |
|---|---|---|---|
| 846,999 | 9/1960 | Great Britain | 333/71 |

*Primary Examiner*—Herman Karl Saalbach
*Assistant Examiner*—Wm. H. Punter
*Attorney*—Waters, Roditi, Schwartz and Nissen

[57] ABSTRACT

The present invention relates generally to the techniques of filtering electric oscillations and more particularly to electromechanical filters effective preferably within the frequency bandwidth of from a few to 10's of kilocycles per second.

The essence of the invention resides in the fact that in the herein-disclosed electromechanical filters, the bonds interconnecting the mechanical resonators with one another and with the magnetostrictive converters, are built up of elements dumbbell-like in shape. Such an engineering solution allows the provision of highly reliable, small-sized narrow-band electromechanical filters suitable for operation within the frequency range of from a few to hundreds of kilocycles per second.

1 Claims, 5 Drawing Figures

MULTISECTION ELECTROMECHANICAL BANDPASS FILTER

The present invention relates generally to techniques of filtering electrical oscillations and more particularly to electromechanical filters preferably effective within the frequency range of from a few to 10s of kilocycles per second.

Known in the art are multisection bandpass electromechanical bar-type filters featuring dumbbell like mechanical resonators and dumbbell like magnetostrictive converters interconnected by means of cylindrical bonds, both simple (single-element) and composite (three-element) ones (cf. British Pat. No. 947145).

The main disadvantages inherent in the filters described above, are that these filters fail to operate at low frequencies and it is impossible to employ many sections to make highly selective low-frequency filters, so that provision of low-frequency filters is predominantly restricted by the allowable mechanical strength of the filter and technological means and resources available for its manufacture.

A combination of mechanical dumbbell like resonators and simple cylindrical bonds in a low-frequency bar-type filter, results in an increased minumum ratio between the characteristic wave impedances of both.

Moreover, in order not to go beyond the limits of the allowable mechanical strength of the filter and at the same time to provide technological means and resources for its manufacture, the length of the bond is selected to be substantially shorter as compared to an optimum bond length $\lambda_{bond\ opt.}$ which is equal to one-quarter of a wavelength of mechanical oscillations. All the above-mentioned leads to a diminished mistuning between the filter resonators and in failure to provide highly selective low-frequency filters featuring simple cylindrical bonds.

The use of composite cylindrical bonds promotes the narrowing of a frequency band. However, the linear dimensions of low-frequency filters are so extended in this case that it becomes impracticable to make such a filter incorporating a reasonably large number of sections and, consequently, to provide the required selectivity of the filter.

Furthermore, the use of composite cylindrical bonds as is the case with simple cylindrical bonds, fails to provide extremely narrow frequency bands, since each of the elements constituting a composite bond, is to be assumed to have a considerably smaller length than the optimum one.

It is an object of the present invention to eliminate the disadvantages mentioned above.

It is another main object of the present invention to provide a small-sized, highly reliable and selective narrow-band electromechanical filter adapted to operate within a frequency range of from a few to tens of kilocycles per second.

The above objects are accomplished due to the fact that in a multisection electromechanical filter its bonds are made up of dumbbell like elements and are therefore referred to as dumbbell like bonds.

Such a structural feature of the bonds allows the linear dimensions of the filter to be substantially reduced and, concurrently, makes it possible to obtain bonds of a necessary equivalent wave-producing length, including those of an optimum length equal to one-quarter of a wavelength of mechanical oscillations. Moreover, the stiffness of the entire system is positively increased due to reduced linear dimensions of the filter and by virtue of smoother transitions from larger-diameter resonators to smaller-diameter bonds.

Therefore it is possible to enhance the filter reliability, to obtain low-frequency bands and extend the sensitivity of the filter by making use of a great number of sections thereof.

The invention will be described hereinbelow by way of illustration of an exemplary embodiment thereof with due reference to the accompanying drawings, wherein.

Figure 1:
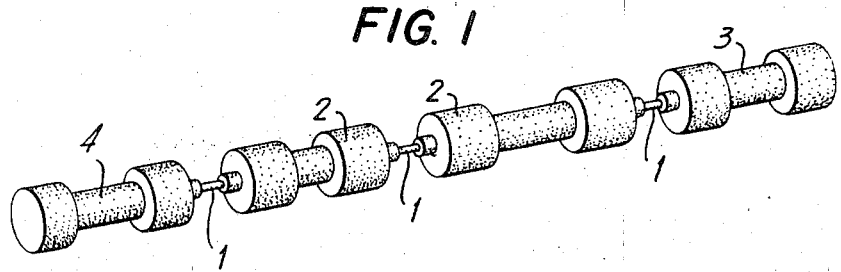
FIG. 1 is a prospective view of a multisection electromechanical bandpass filter, according to the invention.

As it is evident from FIG. 1 the filter of the present invention comprises dumbbell like resonators 2 and magnetostrictive ferrite converters i.e., an input converter with a magnetostrictive ferrite element 3 and an output converter with a magnetostrictive ferrite element 4, said resonators and said converters being interconnected by means of dumbbell like bonds 1. With a voltage impressed upon the electric circuit (not appearing in the drawing) of the input converter, torsional oscillations arise in the magnetostrictive ferrite element 3, said oscillations being then filtered by the entire mechanical system of the herein-considered filter.

Figure 4:
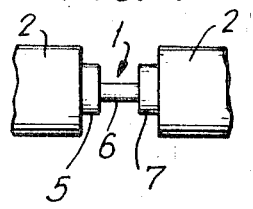
FIG. 4 is an elevational view showing a simple dumbbell like bond, according to the invention.

Thereupon the output converter with the magnetostrictive element 4 converts mechanical oscillations into electrical oscillations. In the herein-presented filter use is made of simple single-element dumbbell like bonds (FIG. 4). However, in some cases in the above-mentioned filters it is expedient to employ composite dumbbell like bonds represented in FIG. 5 constituted of a few dumbbell like elements.

Some calculations are stated hereinbelow to prove the advantages of the herein-disclosed multisection electromechanical filter featuring its bonds made as dumbbell like elements, over the commonly employed filters with conventional-type cylindrical bonds.

It is known that the passband effective for a single-section of the electromechanical filter featuring the narrowest frequency bandwidth (the elements of the filter bond having a length of $\lambda/4$), can be approximated from the following equation:

$$\frac{2 \cdot \Delta F}{f_o} \approx \frac{2}{\pi} \cdot \frac{1}{Z_r/A_{21}/f_o},$$

where $\Delta F$ is a pass band of a filter section; $f_o$ is an average frequency of the passband $Z_r$ stands for the resonator characteristic impedance (a section with identical resonators being assumed to be dealt with); and $/A_{21}/f_o$ denotes the modulus of the factor $A_{21}$ of the chain matrix effective for the medium frequency bandwidth of the filter passband (numeral 21 indicating the position of "A" in the matrix, i.e., 2nd line, first row).

With the value of $Z_r$ being constant, the filter passbands are the function of the factor $A_{21}$.

For a simple cylindrical bond (FIG. 2) having a length of $\lambda/4$, the matrix can be expressed as follows:

$$||A_{s.c.b.}|| = \left\| \begin{matrix} 0 & j\frac{1}{Z_{b.s.}} \\ jZ_{b.s.} & 0 \end{matrix} \right\|,$$

where
$Z_{b.s.}$ symbolizes the characteristic impedance of a section 1 (the subscript b.s. indicating "simple bond").

The matrix that holds true of a simple dumbbell like bond (FIG. 4) can be written down in terms of the following formulas:

$$||A_{s.d.b.}|| = \left\| \begin{matrix} 0 & j\frac{1}{Z_{db1}}\sqrt{\frac{l_{2d}}{l_{1d}}}\frac{1}{\sqrt{K_{dd}}} \\ jZ_{db1}\sqrt{K_{dd}}\sqrt{\frac{l_{1d}}{l_{2d}}} & 0 \end{matrix} \right\|;$$

$$\beta = \sqrt{\frac{K_{dd}}{l_{1d} \cdot l_{2d}}}; \quad Z_{edb} = Z_{db1} \cdot \sqrt{K_{dd}} \cdot \sqrt{\frac{l_{1d}}{l_{2d}}};$$

where: s.d.b. denotes "simple dumbbell like bond"; $Z_{db1}$ denotes the characteristic impedance of a bond section 5 or 7;

$$K_{dd} = \frac{Z_{db2}}{Z_{db1}} \ll 1$$

designates the dumbbell detuning factor; $Z_{db2}$ denotes the characteristic impedance of a bond section 6

$$\beta = \frac{2\pi}{\lambda};$$

$l_{1d}, l_{2d}$ stand for the length of the bond sections 5 or 7 and 6, respectively;

$Z_{edb}$ is the equivalent characteristic impedance of the bond under consideration.

Now let us consider the case where $\iota_{1d} = \iota_{2d}$.

Assume the equality $Z_{s1} = Z_{ed}$ to be the condition of equivalency.

As it is evident from the afore-stated expression for the filter passband, a reduction of the bond characteristic impedance results in a narrowed filter passband but, concurrently, in a reduced mechanical strength of the entire system. When dealing with a dumbbell like bond, an inequality $Z_{ed} < Z_{s1}$ may be assumed to hold true of the case, since the diminished linear dimensions of the dumbbell like bonds and smoother diametral variations in transition from resonators to a bond, considerably increase the mechanical rigidity of the entire system.

Thus, the condition of equality of characteristic impedances is considered to be a nonoptimum one, and substantially narrower pass-bands are achievable in the system employing a dumbbell like bond.

To provide a simpler analysis, considered hereinbelow is the case of a symmetrical bond that can be expressed as follows:

$$Z_{db} = \frac{Z_{bs}}{\sqrt{K_{dd}}}; \quad l_{\Sigma d} = l \cdot \frac{3}{\pi} \sqrt{K_{dd}}, \text{ where}$$

$\iota_d$ is a total dumbbell length;

$\iota$ is the length of a single dumbbell section or of a simple cylindrical bond.

Figure 2:
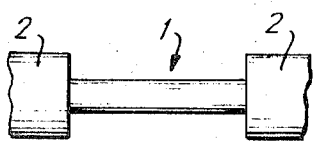
FIG. 2 is an elevation view showing a simple cylindrical bond.

The following equations will be true of the mode of torsional oscillations:

$$d_{1db} = \frac{d}{\sqrt[8]{K_{dd}}}, \quad d_{2db} = d\sqrt[8]{K_{dd}}$$

where: $d_{1db}$ denotes for the diameter of the bond section 5 or 7;

$d_{2db}$ denotes the diameter of the bond section 6;

$d$ is the diameter of the simple cylindrical bond 1 (FIG. 2).

$$K_{dd} = \frac{1}{9}; \quad \left(\frac{d_{1db}}{d_{2db}} \approx 1.57\right); \text{ whence}$$

$$l_{\Sigma d} \approx 0.318 l$$

Thus, even with such a negligible discrepancy of diameters, the overall length of a simple dumbbell like bond is found to be three times as low as the length of a simple cylindrical bond, the frequency passband remaining equal. Besides, the mechanical strength and structural ruggedness of the entire system becoming substantially higher, narrower filter passbands are obtainable.

With the relation $$\frac{d_{1db}}{d_{2db}} = 2 \text{ and } K_{dd} = \frac{1}{16}$$

the length of a simple dumbbell like bond is 4 times as small as that of a simple cylindrical bond.

Figure 3:
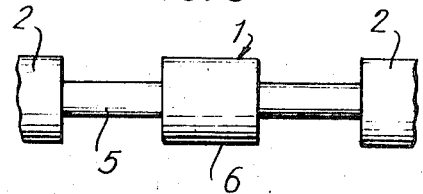
FIG. 3 is an elevational view showing a composite bond built up from three cylinder-shaped elements.
Figure 5:
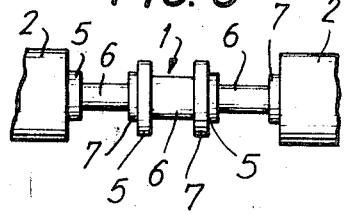
FIG. 5 is an elevational viewing showing represents a composite bond made up of three dumbbell like elements, according to the invention.

Analogous relations are found to remain true for the case where a composite cylindrical bond (FIG. 3) is substituted by a composite dumbbell like bond (FIG. 5).

Taking in due consideration a substantial increase in the mechanical strength of the filter due to the use of dumbbell like bonds, one can make the filter pass-bands far narrower as compared to both simple and composite cylindrical bonds by virtue of reducing the value of $Z_{db}$, or also can diminish the length of bonds by correspondingly reducing the value of $Z_{db}$.

Thus, all other factors being equal, the length of the dumbbell like bonds in question can account for from one-fifth to one-tenth of the length of the cylindrical bonds. It is noteworthy that no low-frequency filter is achievable by making use of simple or composite cylindrical bonds whose elements have a length of $\lambda/4$.

Inasmuch as the length of composite bonds in narrow-band low-frequency filters becomes comparable to the length for resonators, the resort to dumbbell like bonds makes it possible not only to diminish the filter passband but also to reduce the filter length several times which fact in turn enables the effective filter frequency bandwidth to be lowered and the number of sections in the narrow passband system to be increased.

The electromechanical filter in contemplation provides for a highly selective filtration of incoming electric signals at any preselected frequency within the range of from 6 to 150 kc./s. and with an effective passband set within the limits of from 0.05 to 3 per cent of the filter mean frequency.

Moreover, the squareness factor of the amplitude-frequency response curve of the filter involved is not in excess of two at the levels of 6db. and 40db., whereas its selectivity is found to be not lower than 70db, when detuned by 1.5 pass-bands.

The herein-disclosed filter features its regularity attenuation within the effective passband to be below 5db, the temperature coefficient of frequency of the filter being not in excess of $$10.10^{-6} \frac{1}{\deg.}$$

within the temperature range of from $-10$ to $+60°$ C.

The herein-proposed multisection electromechanical bandpass filter may be implemented to operate not only within the frequency range of from 6 to 150 kc./s. as specified above but also at higher frequencies featuring narrow pass-bands.

All the aforementioned results in the provision of a midget-type high-frequency filter.

It is worth noting that the filter production technique makes provision for its mechanical system to be simply and readily rebuilt, in particular when tuning for the passband by appropriately varying the sections 6 (FIGS. 3 and 5) which fact is of special importance when making a series of such filters preliminarily tuned for different frequencies.

In the filter of the invention, wherein all the elements are dumbbell shaped, it is possible, without changing the total length of each element, but only by varying the relationships of the diameters and lengths of uniform sections 5, 6, 7 of the dumbbells (i.e., those with a constant cross section), to obtain filters with different pass bands and with different average frequencies, while preserving the total length and external diameter of the oscillating system. Thus, the same elements or structural components can be used for making filters with different working frequencies.

What is claimed is:

1. A multisection electromechanical bandpass filter, said filter comprising mechanical dumbbell like resonators, a magnetostrictive dumbbell like converter and bonds constituted respectively of elements of dumbbell shape for interconnecting said resonators and said converters.

* * * * *